(12) United States Patent
Lagger

(10) Patent No.: US 12,350,780 B2
(45) Date of Patent: Jul. 8, 2025

(54) MACHINE BASE FOR USE IN A MACHINING SYSTEM AND MACHINING SYSTEM COMPRISING SUCH A MACHINE BASE

(71) Applicant: MIKRON SA AGNO, Agno (CH)

(72) Inventor: Luciano Lagger, Collina d'Oro (CH)

(73) Assignee: MIKRON SA AGNO, Agno (CH)

( * ) Notice: Subject to any disclaimer, the term of this patent is extended or adjusted under 35 U.S.C. 154(b) by 767 days.

(21) Appl. No.: 17/279,738

(22) PCT Filed: Sep. 28, 2018

(86) PCT No.: PCT/EP2018/076438
§ 371 (c)(1),
(2) Date: Mar. 25, 2021

(87) PCT Pub. No.: WO2020/064122
PCT Pub. Date: Apr. 2, 2020

(65) Prior Publication Data
US 2022/0032418 A1    Feb. 3, 2022

(51) Int. Cl.
*B23Q 37/00*    (2006.01)
*B23Q 39/02*    (2006.01)

(52) U.S. Cl.
CPC ......... *B23Q 37/005* (2013.01); *B23Q 37/007* (2013.01); *B23Q 39/026* (2013.01)

(58) Field of Classification Search
CPC ................ B23Q 37/007; B23Q 37/005; B23Q 39/025
See application file for complete search history.

(56) References Cited

U.S. PATENT DOCUMENTS 2,565,784 A * 8/1951 Sheean ................ A47B 88/493
312/286
3,920,299 A * 11/1975 Propst ...................... B01L 9/02
312/107
(Continued)

FOREIGN PATENT DOCUMENTS

DE    102004028172 A1    12/2005
DE    102005035766 A1    3/2006
(Continued)

*Primary Examiner* — Lee D Wilson
(74) *Attorney, Agent, or Firm* — Nath, Goldberg & Meyer; Jerald L. Meyer; Morgan D. Rosenberg

(57) ABSTRACT

A machine base for use in a machining system is provided. The machine base includes at least one work piece holder device receiving section having a work piece holder device interface, which includes an aligning device adapted for receiving the work piece holder device aligned on a z-axis. The machine base further includes at least one first machining unit receiving section provided with a first machining unit interface adapted for receiving a first machining unit including a first tool holder interface, and at least one second machining unit receiving section provided with a second machining unit interface adapted for receiving a second machining unit including a second tool holder interface. The first and second machining unit interfaces are arranged on opposing first and second sides of the work piece holder device interface and are movable at least along the x-axis or y-axis, respectively.

17 Claims, 10 Drawing Sheets

(56) References Cited

U.S. PATENT DOCUMENTS

Figure 3:
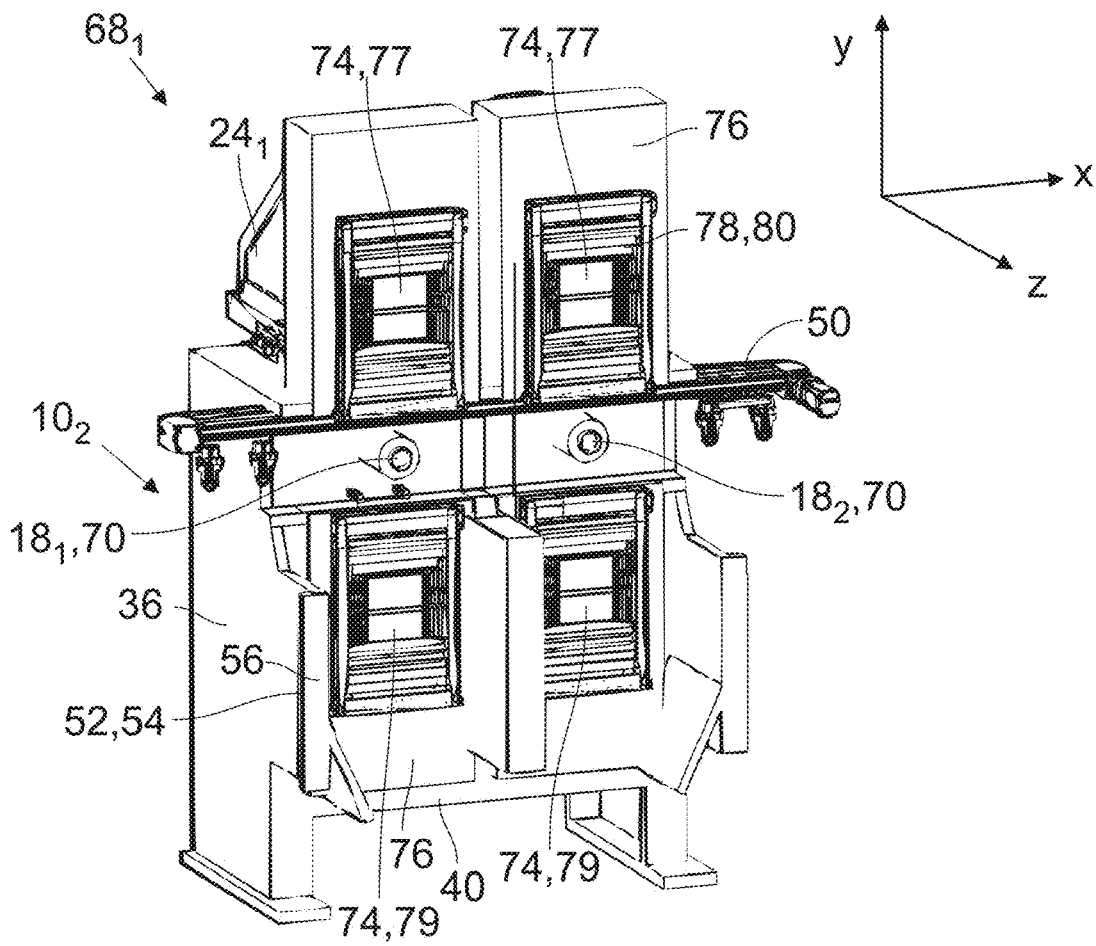

| | | | | |
|---|---|---|---|---|
| 4,874,027 | A | * | 10/1989 | Boundy ............... A47B 83/001 |
| | | | | 160/218 |
| 5,806,258 | A | * | 9/1998 | Miedema .............. E04B 2/7437 |
| | | | | 52/239 |
| 10,172,455 | B2 | * | 1/2019 | Arthur ................. A47B 83/001 |
| D923,377 | S | * | 6/2021 | Mohan ........................... D6/698 |

FOREIGN PATENT DOCUMENTS

| | | |
|---|---|---|
| DE | 102007044060 A1 | 3/2009 |
| EP | 2305404 A1 | 4/2011 |
| EP | 3162476 A1 | 5/2017 |
| WO | 2007137690 A1 | 12/2007 |
| WO | 2012042029 A1 | 4/2012 |
| WO | WO-2020064122 A1 * | 4/2020 ........... B23Q 37/005 |

* cited by examiner

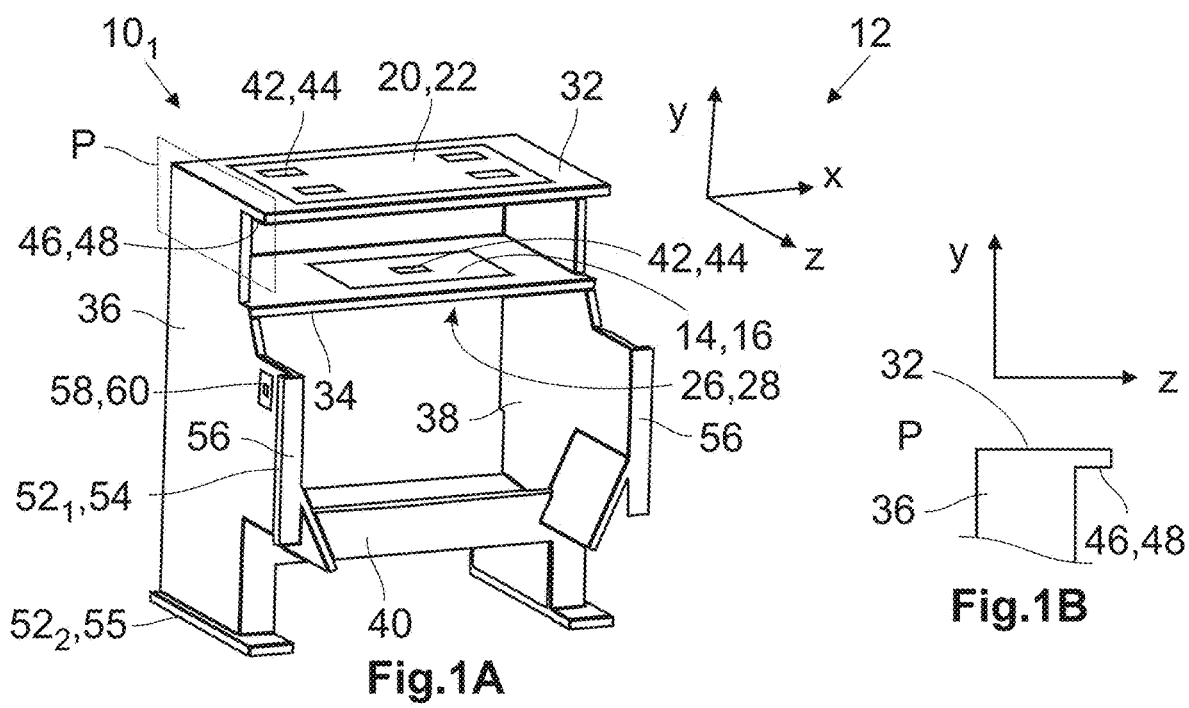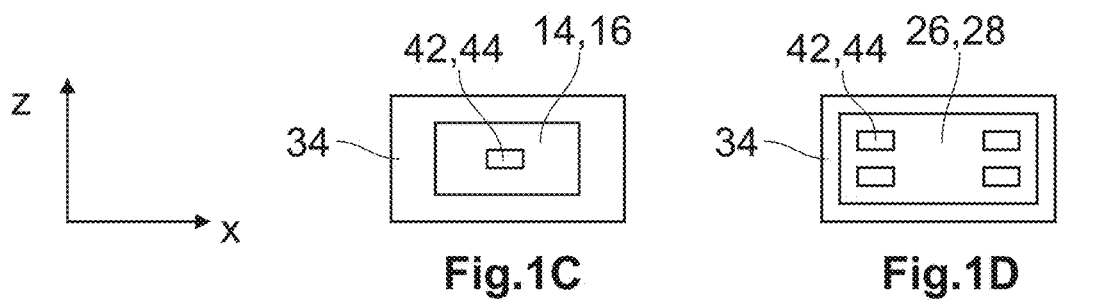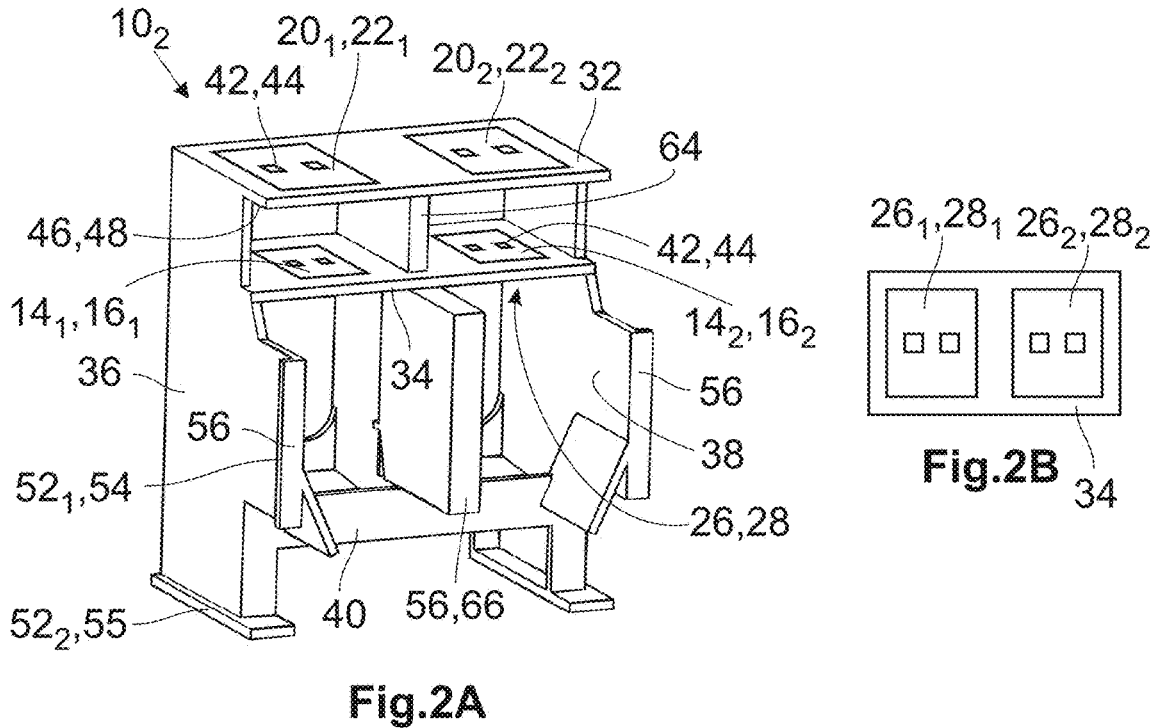

MACHINE BASE FOR USE IN A MACHINING SYSTEM AND MACHINING SYSTEM COMPRISING SUCH A MACHINE BASE

The present invention relates to a machine base for use in a machining system. Beyond that the present invention relates to a machining system comprising such a machine base.

Within the scope of the present invention the term "machine base" is construed as supporting parts supporting machining entities, machine stations and auxiliary units typically used along with machining entities such as tool holding devices. In some cases machine bases are also referred to as machine frames or machine beds.

The term "machining system" is construed as an entity comprising a number of machining entities or machining stations and units typically used along with machining entities.

Machining systems are used in case a give work piece is to be provided with a shape that requires a plurality of different machining steps that cannot be conducted by one single machining entity only. Machining systems thus comprise a number of machining entities each of which conducting a specific machining process. A characteristic feature of machining systems is that the work piece has to be transferred from one machining entity to another machining entity. In case two machining entities are located opposite each other the work piece may be transferred in that the work piece holder device holding the workpiece is aligned along a common axis with the work piece holder device of the opposite machining entity not carrying a workpiece. The two work piece holder devices are placed in proximity to each other so that both work piece holder devices may simultaneously grip the work piece. The work piece holder device previously holding the work piece now releases the work piece and the two work piece holder devices are separated from each other. Such machining systems are disclosed in EP 2 021 148 A1.

Another way to transfer the work piece from one machining entity to another one oppositely oriented could be that the pre-machined work piece gripped by the second work piece holder, is cut from the section of the bar-like or rod-like work piece still gripped by the first work piece holder using a rotating cutting tool.

In case a work piece needs to be machined by more than two machining entities there is the need to transfer the work piece not only between oppositely arranged machining entities but also between machining entities arranged laterally displaced to each other. Such machining systems may comprise three machining entities, two of which are laterally arranged and a third machining entity arranged opposite the two other machining entities. The third machining entity is movable perpendicular to the common axis mentioned above. Such machining systems require a complex machine base and complex drive units. Moreover, the flexibility of such machining systems is limited in case work pieces that require different machining should be produced. In case the work piece requires less than three machining steps such machining systems cannot economically be operated. Examples of such machining systems are disclosed for example in EP 2 305 404 A1 and EP 3 162476 A1. Further machining systems are disclosed in DE 10 2004 028 172 A1, DE 10 2007 044 060 A1, DE 10 2005 035 766 A1 and WO 2012/042029 A1.

It is one task of the present invention to present a machine base and a machining system that provide a high flexibility in the way a given kind of work piece or a plurality of different work pieces may be machined. Moreover, it is one task of the present invention to enable the simultaneous machining of a given work piece from two sides in a simple and affordable way.

The task is solved by the features specified in claims 1, 7 and 11. Advantageous embodiments are the subject of the dependent claims.

According to one embodiment the machine base defines an x,y,z-coordinate system and comprises
- at least one work piece holder device receiving section provided with a work piece holder device interface comprising aligning means adapted for receiving a work piece holder device aligned along a z-axis of the coordinate system,
- at least one first machining unit receiving section provided with a first machining unit interface adapted for receiving a first machining unit comprising a first tool holder interface,
- at least one second machining unit receiving section provided with a second machining unit interface adapted for receiving a second machining unit comprising a second tool holder interface,
- the first machining unit interface being arranged at a first side of and at a distance from the work piece holder device interface and such that the first tool holder interface is movable at least along the x- or y-axis,
- the second machining unit interface being arranged at a second side of and at a distance from the work piece holder device interface and such that the second tool holder interface is movable at least along the x- or y-axis, the first side opposing the second side, and
- at least one work piece transfer unit receiving section provided with a transfer unit interface adapted for receiving a work piece transfer unit.

The core idea of the present invention is to provide a machine base that is provided with a work piece holder device interface, a first machining unit interface, a second machining unit interface and a work piece transfer unit interface arranged relative to each other as specified above. At least the work piece holder device interfaces comprises aligning means such as pins, grooves, recesses or protrusions that secure that the work piece holder device can only be connected to the work piece holder device interface in an aligned way as outlined above. The work piece holder device is aligned along the z-axis in case a bar-like or rod-like work piece clamped into the work piece holder device runs along or parallel to the z-axis. The machine base according to this embodiment provides the user with the possibility to connect a work piece holder device to the work piece holder device interface such that the work piece is held and movable along the z-axis into the desired machining position. During the machining the work piece may stand still. The relative movement between the tool and the work piece gripped by the first work piece holding unit may be realized by the first machining unit. If the user wishes to machine the work piece with a second machining unit he may simply connect the second machining unit to the second machining unit interface of the machine base. If the first or the second machining unit is not adapted for a specific machining step the user may adapt the configuration of the respective machining unit without much effort.

The term "x-axis" is not to be construed as to relate to one axis only but to a plurality of axes that run parallel to each other. The same is true for the terms "y-axis" and "z-axis". The term "aligned along" may also be construed as "parallel to".

In the machine base according to the present disclosure the work piece holder device interface defines an x-z-plane, the first machining unit interface is running parallel or perpendicular to the x-z-plane and adapted for receiving the first machining unit, and the second machining unit interface is running parallel or perpendicular to the x-z-plane and adapted for receiving the second machining unit.

It can be concluded from this arrangement that the alignment of the first machining unit and the second machining unit is conducted with reference to the z-axis. The machine base of this embodiment is thus very compact and the accessibility to the work piece is ensured.

In accordance with the present disclosure the x-z-plane is running horizontally. The work piece holder is aligned along the z-axis so the orientation of the x-z-plane is decisive for the orientation of the entire machining system. In this embodiment the x-z-plane is running horizontally so that the work piece holder, the first and the second machining unit and the work piece transfer unit are also aligned horizontally. The mounting of the machining units is facilitated as the receiving sections are supporting the machining units already when the units are placed on them.

According to the present embodiment the first machining unit interface is arranged above the work piece holder device interface and facing upwards and/or the second machining unit interface is arranged below the work piece holder device interface and facing downwards. In this embodiment the machining system can be kept compact as the machining units can be located close to each other.

In yet a further embodiment the transfer unit interface is running parallel to the x-z-plane and adapted for receiving the work piece transfer unit aligned along the x-axis. The transfer of the work piece to and from the work piece holder device is facilitated.

In a further embodiment the machine base comprises at least one lateral aligning interface running parallel to the y-z-plane for aligning the machine base with a further machine base. The number of machining units that may be used for machining a given work piece can be doubled. The aligning interfaces ensure that the two machine bases can be aligned to each other with the needed accuracy. Due to the fact that each of the machine bases comprises a work piece transfer unit interface the work piece transfer unit can be designed such that it may transfer a given work piece between the two aligned machine bases and along the x-axis. In this embodiment up to four machining units may be mounted on the machine bases so that a given work piece can be subjected to four different machining steps. As outlined above, one or more machining units may be reconfigured in case they may not be suited for conducting the desired machining process. In case only three different machining units are needed one of the machining unit interfaces may be left empty.

According to another embodiment the machine base comprises at least one front aligning interface running parallel to the x-y-plane for aligning the machine base with a further machine base. In the embodiment previously discussed two machine bases may be aligned laterally to each other. In this embodiment two machine bases may be aligned opposite to each other. The work piece may be transferred in that the two opposing work piece holding devices are arranged in proximity to each other so that they may grab the work piece simultaneously. In many cases the work pieces have a rod-like or bar-like shape in its initial state. In this case a cutting tool may be used to separate one portion from the other one. This embodiment is particularly suited for machining opposite ends of a work piece.

In a further embodiment the machine base comprises at least one swiveling device receiving section provided with a swiveling device interface and adapted for receiving a swiveling device. The swiveling device serves for transferring a work piece between oppositely arranged machining units. As explained above this transfer may be conducted by two opposing work piece holding devices, however, in this case the work piece is not reversed. In case the same end of a work piece should be machined by to opposing machining units the work piece must be reversed which is done by the swiveling device. The swiveling device is also needed when the work piece is clamped into a palette. By means of a palette one or more work pieces are clamped only once and is not released or re-clamped throughout the entire machining process, so the final work piece precision is not affected by re-clamping lack of accuracy. Palettes can be provided with a very precise interface by which they are clamped into the work piece holding device. The work pieces clamped into the palettes may thus be positioned more accurately compared to work pieces directly clamped into the work piece holder device.

In a further embodiment the machine base comprises
 a first work piece holder device receiving section provided with a first work piece holder device interface,
 a second work piece holder device receiving section provided with a second work piece holder device interface,
 a primary first machining unit receiving section provided with a primary first machining unit interface,
 a secondary first machining unit receiving section provided with a secondary first machining unit interface,
 a primary second machining unit receiving section provided with a primary second machining unit interface, and
 a secondary second machining unit receiving section provided with a secondary second machining unit interface.

According to one embodiment discussed above two machine bases are aligned laterally to each other using the lateral aligning interfaces. In this embodiment the two machine bases are integrated into one machine base. In total four machining units can be connected to the respective machining unit interfaces of the machine base in accordance with this embodiment. The machine base according to this embodiment is particularly suited for the machining of work pieces that require three or four machining steps. The alignment of two or more machine bases is not necessary.

Another implementation of the invention is directed to a machining system for machining a work piece, comprising
 at least one machine base according to one of the embodiments previously discussed,
 a work piece holder device connected to the work piece holder device interface and aligned along the z-axis, the work piece holder device being adapted for clamping and aligning a work piece along the z-axis and for moving the work piece along the z-axis, and
 a first machining unit connected to the first machine unit interface and comprising a first tool holder interface movable at least along the x- or y-axis, and/or
 a work piece transfer unit connected to the work piece transfer unit interface.

In this implementation the minimum of units is connected to the machine base that enables the machining or the handling of a work piece. Even in case no machining unit is connected to the machine base but a work piece transfer unit the machining system may be used e.g. for aligning the work piece along the z-axis.

Beyond that the technical effects and advantages as discussed with regard to the present machine base equally apply to the machining system. Briefly, the composition of the machining system can easily be changed according to the requirements of the machining steps that shall be applied to a given work piece.

According to a further implementation the machining system comprises
- the first machining unit connected to the first machining unit interface,
- the work piece transfer unit connected to the work piece transfer unit interface, the work piece transfer unit being aligned along the x-axis, and
- a second machining unit connected to the second machining unit interface and comprising a second tool holder interface movable at least along the x- or y-axis.

In this embodiment the work piece can be machined using two machining units. One or both machining units may comprise a tool holding device such as a revolver carrying a plurality of tools so that the work piece may be machined with more than two tools.

In accordance with a further implementation the machining system comprises
- a first machine base according to one of the embodiments previously presented,
- a second machine base according to one of the embodiments previously presented,
- the first machine base and the second machine base connected to each other via the lateral aligning interface.

A user in possession of a machine base to which a maximum of two machining units can be connected can place a second machine base laterally aligned to the first machine base in case he wishes to machine a work piece by three or four machining units. The flexibility of the machining system is high, in particular as the user may reconfigure one or more of the up to four machining units. Moreover, it is not necessary to use four machining units. The two machine bases may also be equipped with three machining units.

According to a further implementation the machining system comprises
- a third machine base according to one of the embodiments previously presented, and
- a fourth machine base according to one of the embodiments previously presented,
- the third machine base and the fourth machine base connected to each other via the lateral aligning interface,
- the first machine base and the third machine base connected to each other via the front aligning interface, and
- the second machine base and the fourth machine base connected to each other via the front aligning interface.

In this implementation in total four machine bases are aligned to each other, both laterally and via the front. In this implementation the machining system may comprise in total eight machining units so that work pieces having a very complex shape can be produced. Moreover, the machining system according to this implementation may be used for the parallel machining of two work pieces which do not require eight different machining steps but only up to four machining steps.

In another implementation the machining system comprises
- a machine base according one of the embodiments previously presented,
- a first work piece holder device connected to the first work piece holder device interface and aligned along the z-axis,
- a second work piece holder device connected to the second work piece holder device interface and aligned along the z-axis,
- a primary first machining unit connected to the primary first machining unit interface,
- a secondary first machining unit connected to the secondary first machining unit interface,
- a primary second machining unit connected to the primary second machining unit interface,
- a secondary second machining unit connected to the secondary second machining unit interface, and
- a work piece transfer unit connected to the work piece transfer unit interface, the work piece transfer unit being aligned along the x-axis.

In this implementation in total four machining units are connected to one machine base. A work piece requiring four different machining steps may be machined by a machining system according to this implementation. There is no need to align two or more machine bases relative to each other.

In accordance with another implementation the machining system comprises
- a first machine base according to one of the embodiments previously presented,
- a second machine base according to one of the embodiments previously presented,
- the first machine base and the second machine base connected to each other via the front aligning interface.

In this implementation two machine bases of up to four machining units are aligned opposite to each other so that the machining system comprises up to eight machining units. Only two machine bases need to be aligned relative to each other. In this implementation work pieces having a very complex shape can be produced. Moreover, the machining system according to this implementation may be used for the parallel machining of two work pieces which do not require eight different machining steps but only up to four machining steps.

In another implementation the machining system comprises at least one swiveling device connected to the swiveling device interface. The swiveling device is able to transfer a work piece between two oppositely arranged machining units, thereby reversing the work piece. The swiveling device enables the machining of the same end of a work piece. The swiveling device is also needed when the work piece is clamped into a clamping device and the clamping device is used throughout the entire machining steps. Such a clamping device may be embodied as a palette into which one or more work pieces are clamped.

According to a further implementation the work piece holder device, the work piece transfer unit or the swiveling device are adapted for receiving a palette. A work piece clamped into a work piece clamping device installed on a palette can be machined without the need to be released or re-clamped throughout the entire machining process.

Instead the palette is clamped and unclamped. Due to the precise palette interface the accuracy of the interface and due to the fact that the work piece does not need to be released and re-clamped the machining of the work piece can be enhanced. Moreover, it is possible not only to clamp one work piece but a plurality of work pieces into the palette. The machining efficiency can thus be enhanced.

Figure 4:
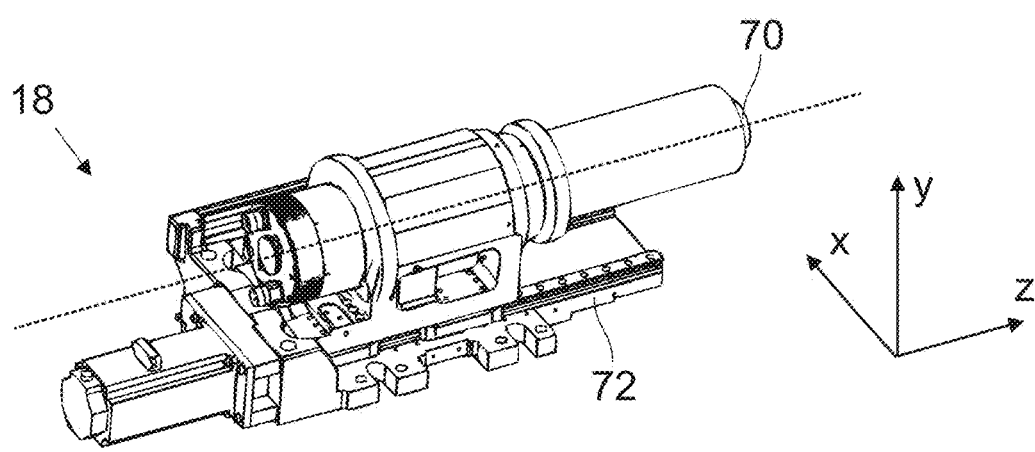
Figure 5A:
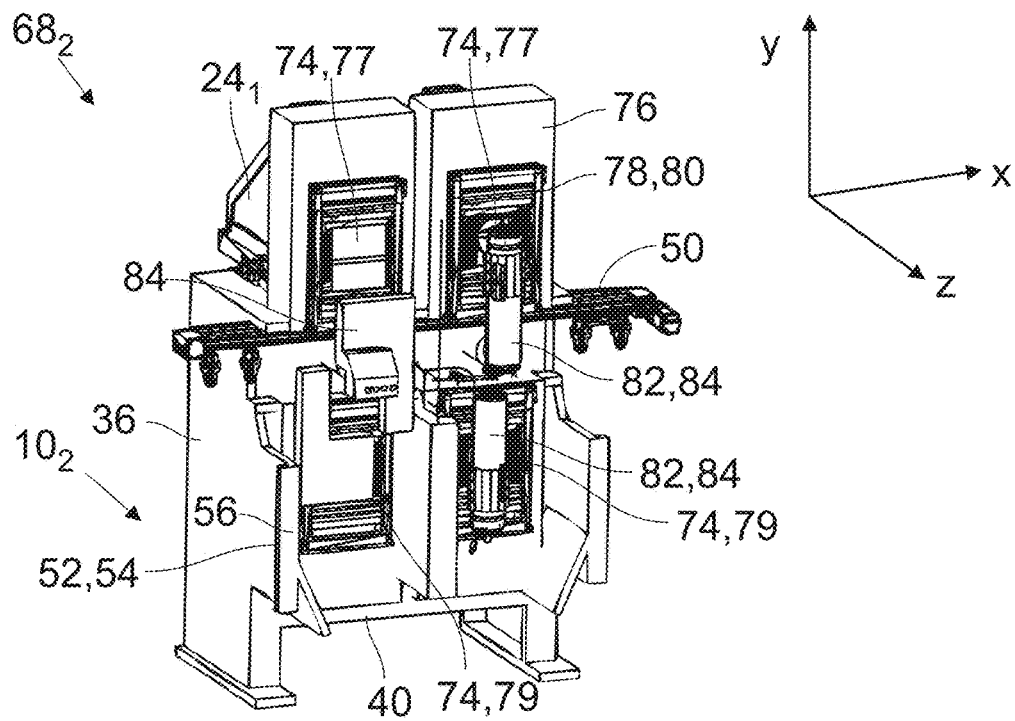
Figure 5B:
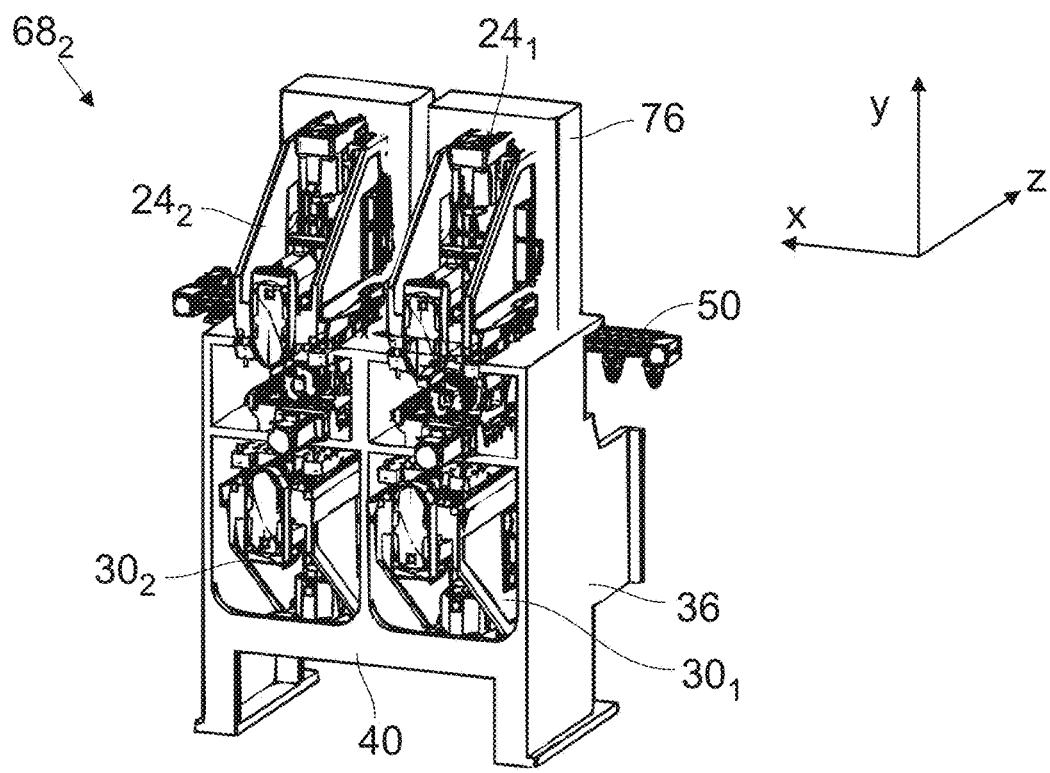
Figure 6A:
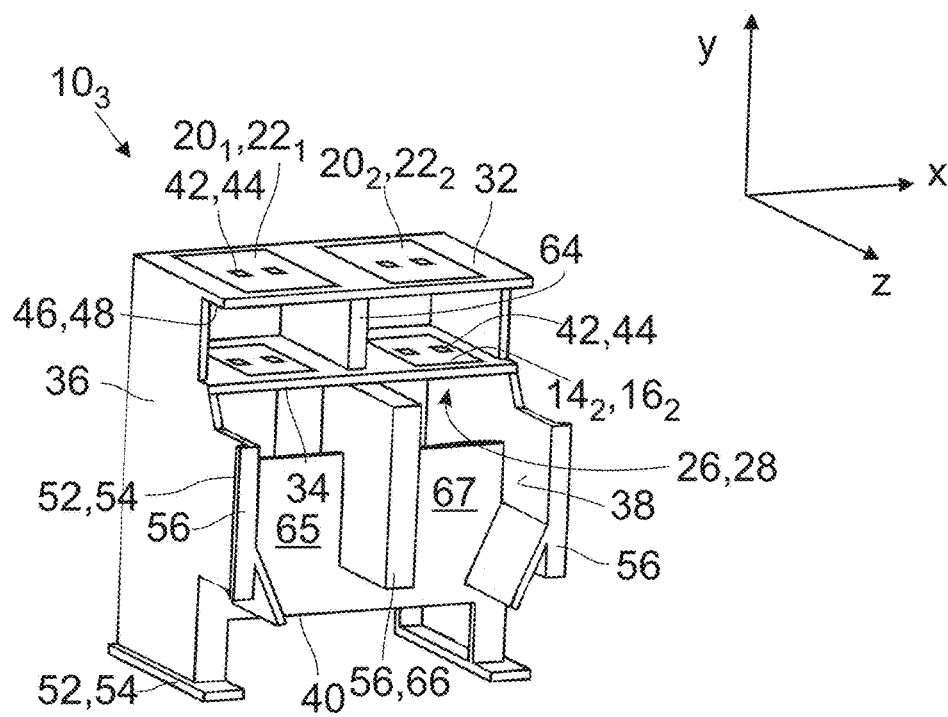
Figure 6B:
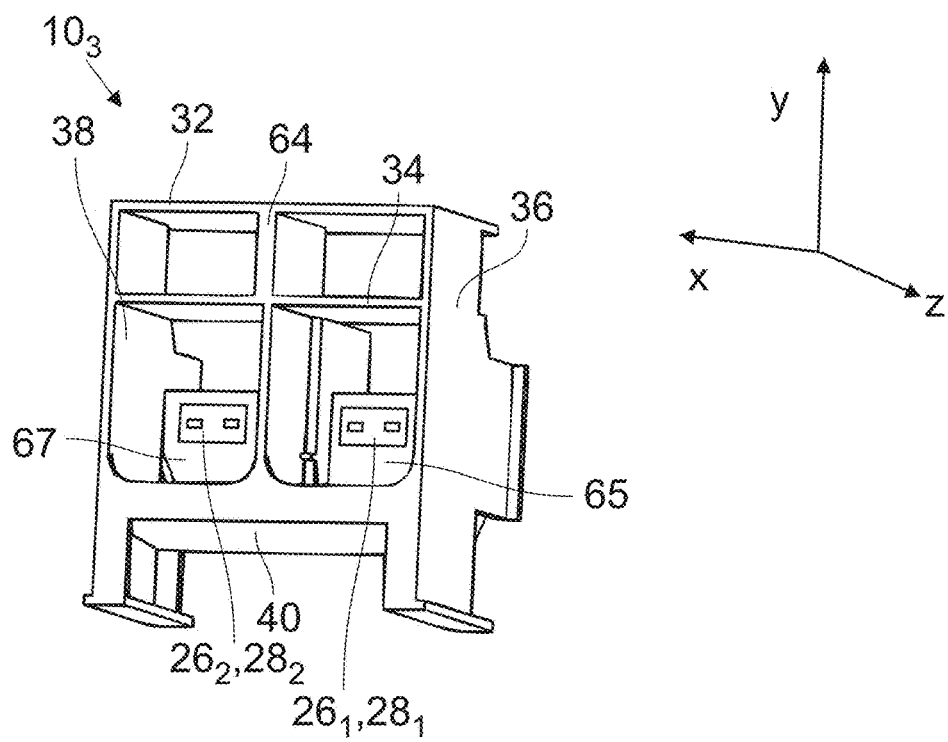
Figure 7A:
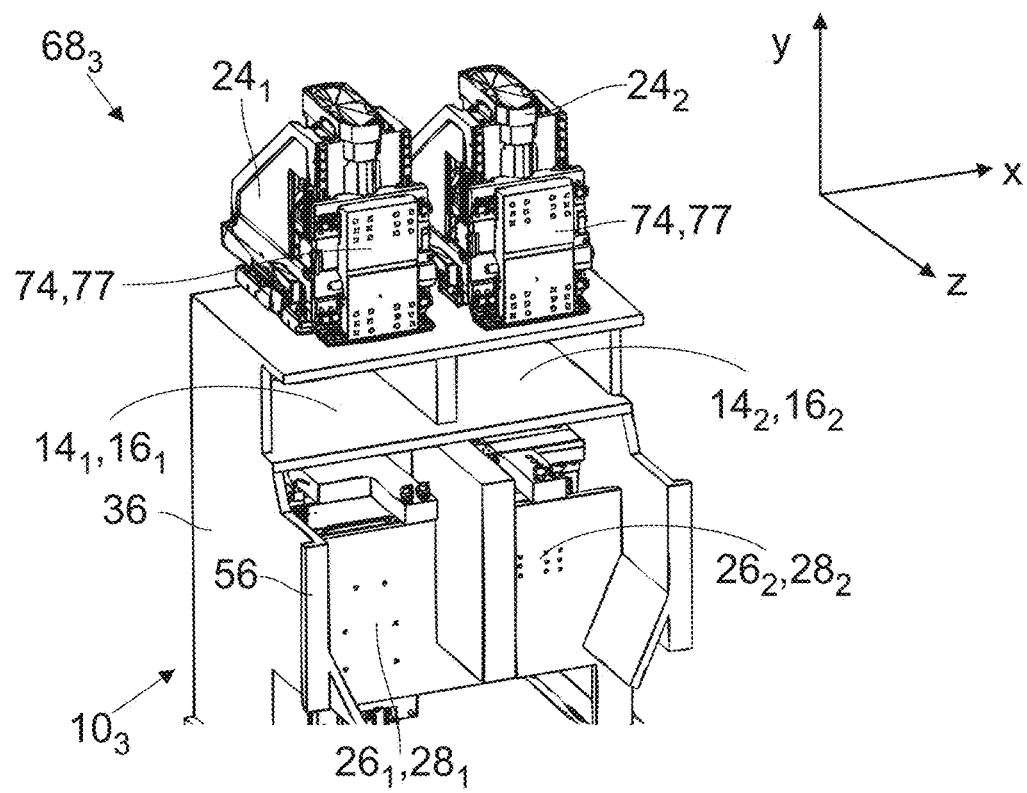
Figure 7B:
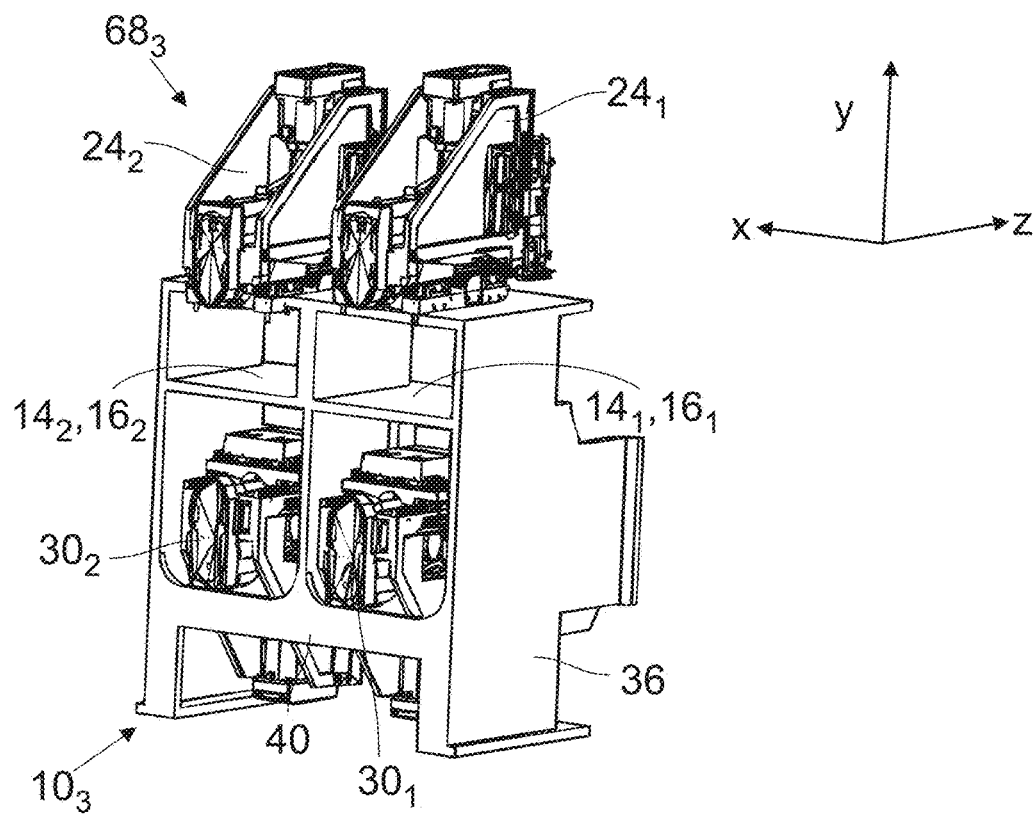
Figure 8A:
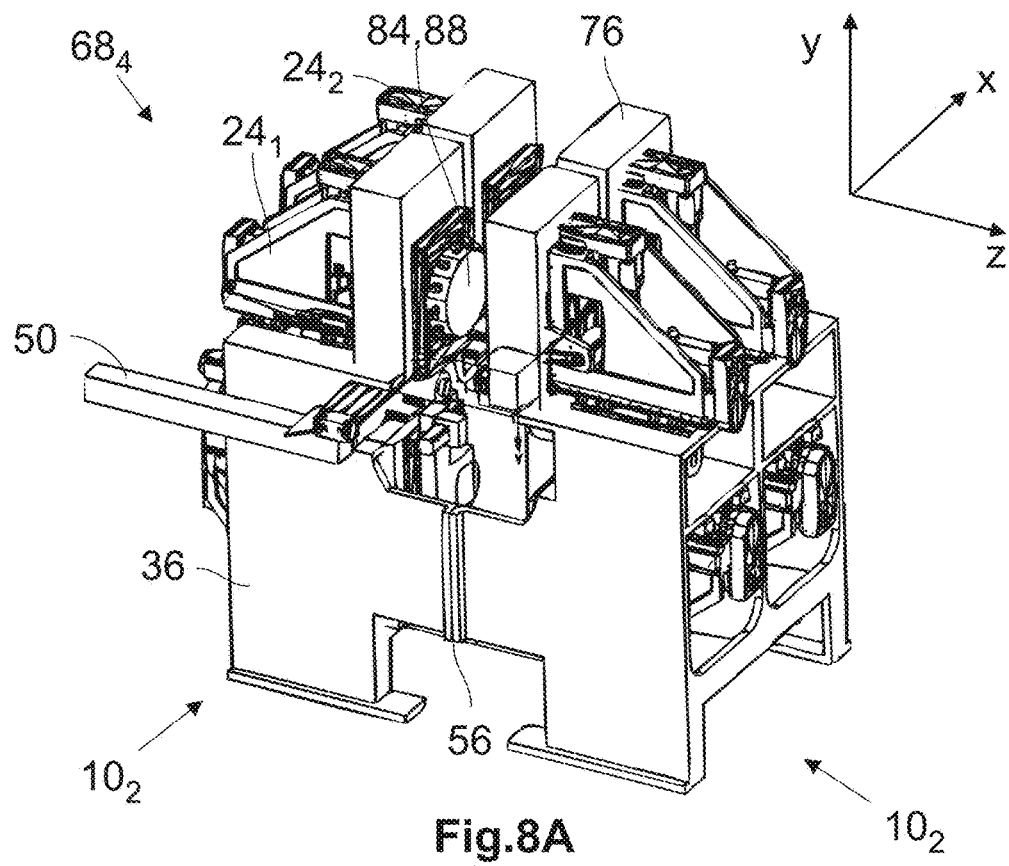
Figure 8B:
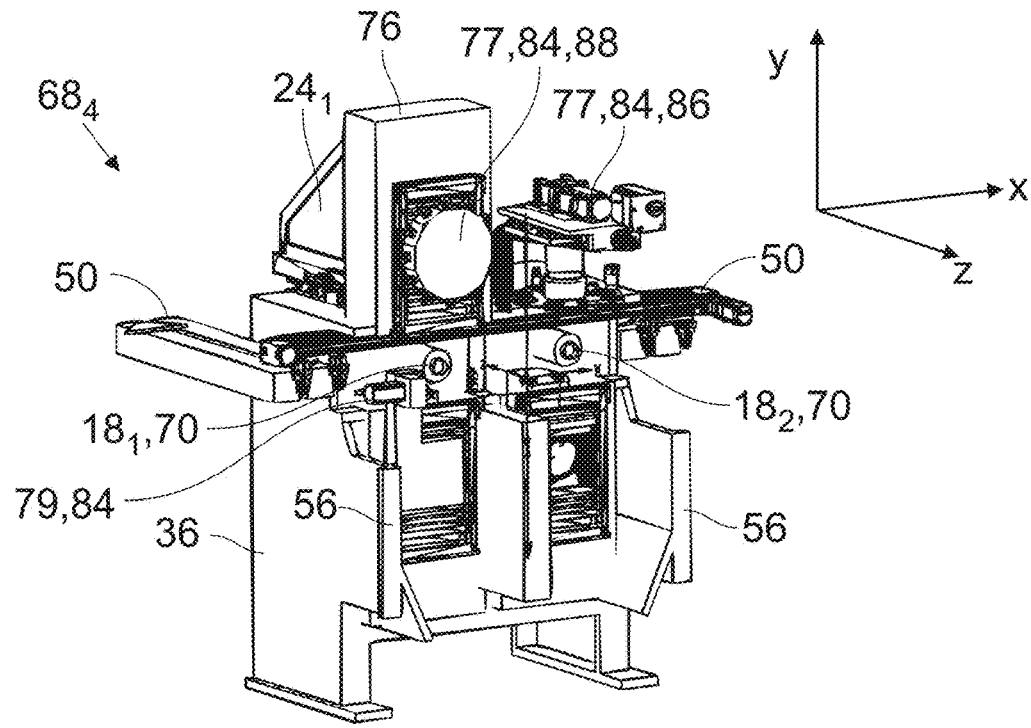
Figure 9:
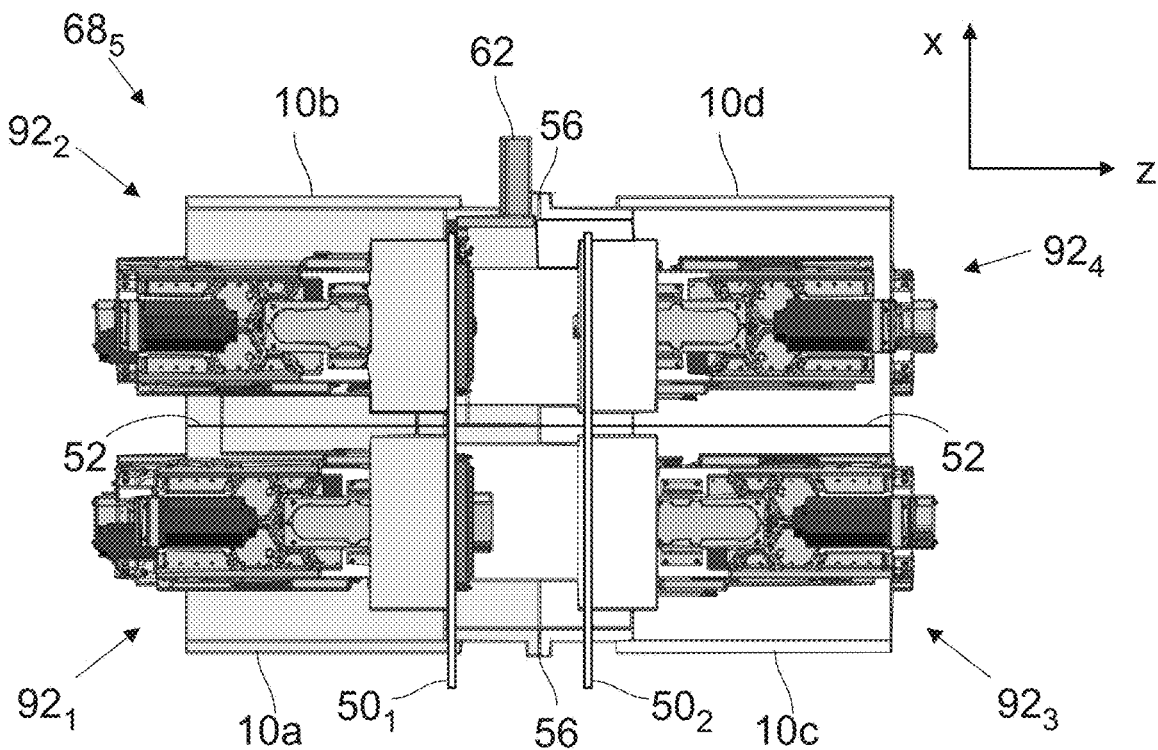
Figures 10A, 10B:
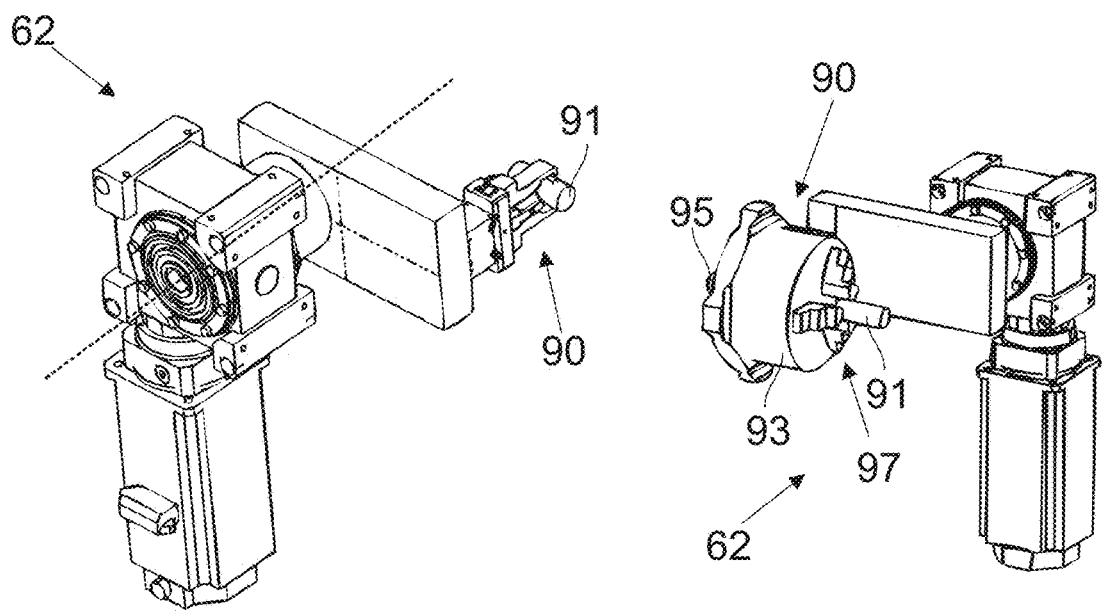
Figure 11A:
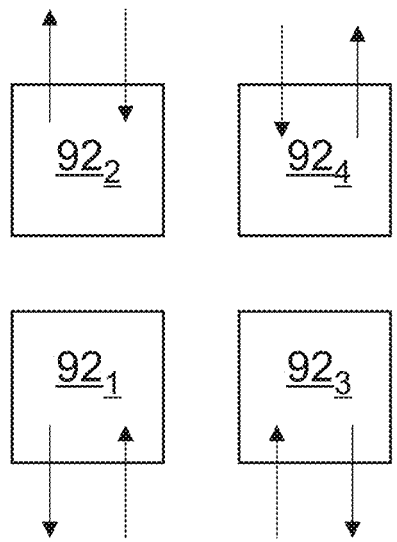
Figure 11B:
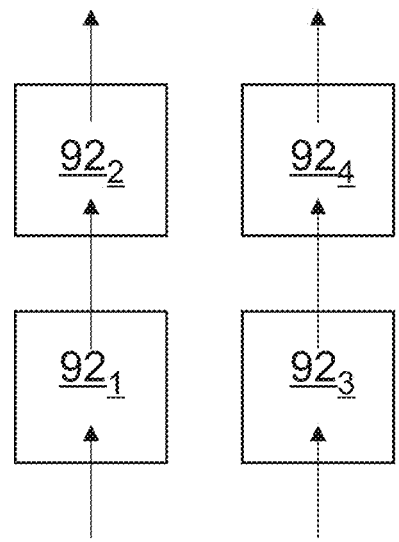
Figure 11C:
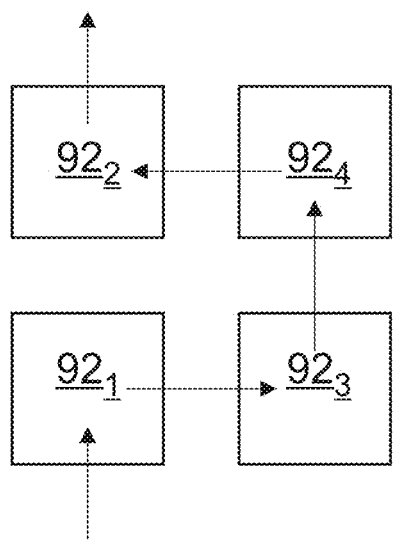
Figure 11D:
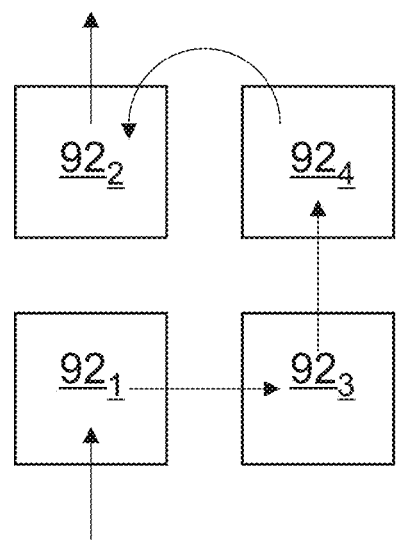
Figure 12:
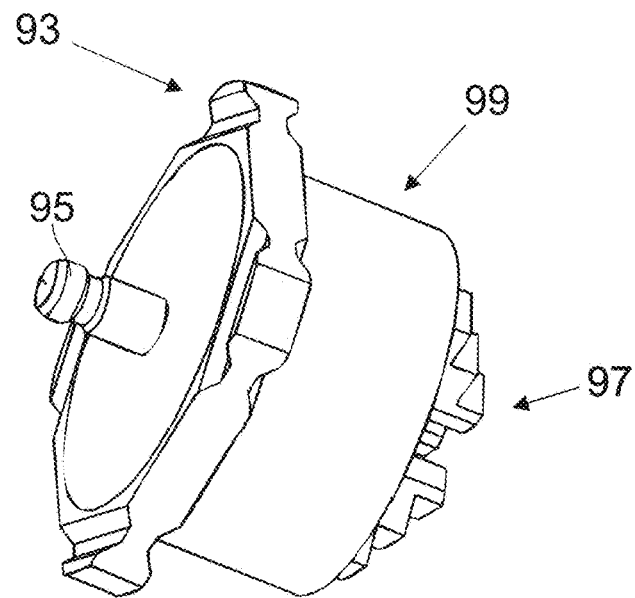
Figure 13:
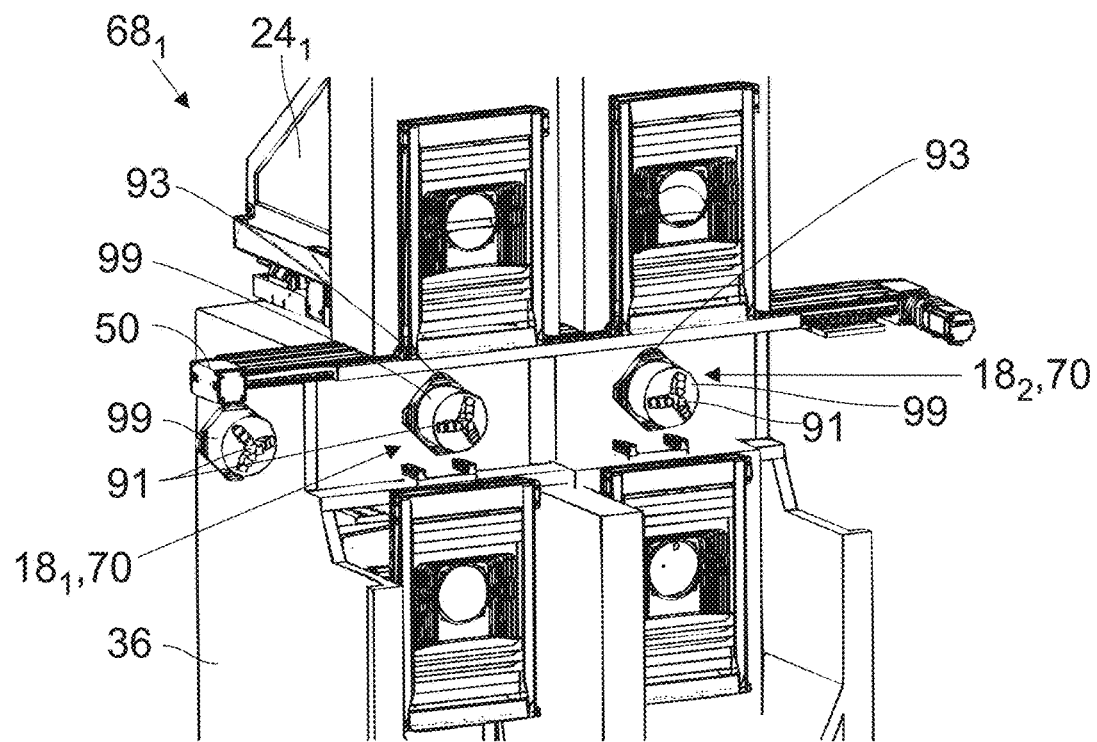

The present invention is described in detail with reference to the drawings attached wherein FIG. 1A is a perspective view of a first embodiment of the present machine base, FIG. 1B is a side view of the section P as indicated in FIG. 1B not drawn to scale, FIG. 1C is a top view of the second machining unit receiving section, FIG. 1D is a bottom view of the work piece holder device receiving section, FIG. 2A is a perspective view of a second embodiment of the present machine base, FIG. 2B is a bottom view of the work piece holder device receiving sections, FIG. 3 is a perspective view of a first embodiment of the present machining system, FIG. 4 is a perspective view of a work piece holder device of the present machining system, FIG. 5A is a front perspective view of a second embodiment of the present machining system, FIG. 5B is a back perspective view of the second embodiment of the present machining system, FIG. 6A is a perspective front view of a third embodiment of the present machine base, FIG. 6B is a perspective back view of the third embodiment of the present machine base according to FIG. 6A, FIG. 7A is a perspective front view of a third embodiment of the present machining system, FIG. 7B is a perspective back view of the third embodiment of the present machining system according to FIG. 7A, FIG. 8A is a front perspective view of a fourth embodiment of the present machining system, FIG. 8B is a front perspective view of the fourth embodiment of the present machining system according to FIG. 8A where some parts are omitted, FIG. 9 is a top view of a fourth embodiment of a machining system, FIG. 10A is a first perspective view of a swiveling device, FIG. 10B is a second perspective view of the swiveling device, FIGS. 11A to 11D are principle sketches explaining modes the machining system of FIG. 9 may be operated, FIG. 12 is a perspective view of a palette and of a clamping device, FIG. 13 is a perspective view of a machining system comprising a work piece transfer unit adapted for transferring palettes, FIG. 14A a first embodiment of a work piece transfer unit in a first position, FIG. 14B the work piece transfer unit of FIG. 14A in a second position, FIG. 15A a second embodiment of the work piece transfer unit in a first position, and FIG. 15B the second embodiment of the work piece transfer unit in a second position.

Reference will now be made in detail to the present exemplary bodies of the disclosure, examples of which are illustrated in the accompanying drawings. Whenever possible, the same or similar reference numbers will be used throughout.

FIG. 1A is a perspective view of a first embodiment of the present machine base $10_1$. The machine base $10_1$ defines an x,y,z-coordinate system 12 and comprises a work piece holder device receiving section 14. The work piece holder device receiving section 14 is provided with a work piece holder device interface 16 defining an x-z-plane and is adapted for receiving a work piece holder device 18 (see FIG. 4) aligned along a z-axis of the coordinate system 12.

Moreover, the machine base $10_1$ according to the first embodiment comprises a first machining unit receiving section 20 provided with a first machining unit interface 22. The first machining unit interface 22 runs parallel to the x-z-plane and is adapted for receiving a first machining unit 24 (see FIG. 3).

Beyond that the machine base $10_1$ according to the first embodiment comprises a second machining unit receiving section 26 provided with a second machining unit interface 28 (see also FIG. 1D). Like the first machining unit interface 22 the second machining unit interface 28 runs parallel to the x-z-plane and is adapted for receiving a second machining unit 30 (see FIG. 5B).

In the first embodiment the first machining unit interface 22 is located on a first traverse girder 32 while the work piece holder device interface 16 and the second machining unit interface 28 are arranged on a common second traverse girder 34 running parallel to the first traverse girder 32. The first traverse girder 32 and the second traverse girder 34 run between a first side wall 36 and a second side wall 38 of the machine base $10_1$. The second traverse girder 34 is separately shown in FIGS. 10 and 1D.

The x-z-plane is running horizontally. The first machining unit interface 22 is arranged above the work piece holder device interface 16 and is facing upwards. The second machining unit interface 28 is arranged below the work piece holder device interface 16 and is facing downwards.

Moreover the machine base $10_1$ of the first embodiment comprises a base traverse girder 40 running between the first side wall 36 and the second side wall 38 near the ground end of the machine base $10_1$.

As the second machining unit interface 28 is facing downwards the work piece holder device interface 16 is facing upwards. As a consequence the first machining unit interface 22 is situated at a first side of and at a distance from the work piece holder device interface 16 and the second machining unit interface 28 is situated at a second side of and at a distance from the work piece holder device interface 16, the first side opposing the second side. Due to the fact that the work piece holder device interface 16 and the second machining unit interface 28 are arranged on the common second traverse girder 34 the distance between the work piece holder device interface 16 and the second machining unit interface 28 is smaller than the distance between the work piece holder device interface 16 and the first machining unit interface 22.

It is also possible to arrange the work piece holder device interface 16 on the first traverse girder 32 facing downwards. The arrangement is chosen depending on the stiffness to be obtained. The machining unit being mounted with the lower stiffness may arranged at a smaller distance to the work piece holder device interface 16 than the machining unit mounted with a higher stiffness, thereby enhancing the accuracy of the machining.

As mentioned above, the work piece holder device interface 16 and the first and second machining unit interfaces 22, 28 are adapted for receiving the work piece holder device 18 aligned along the z-axis and the first and the second machining unit 24, 30. To ensure the alignment along the z-axis the work piece holder device interface 16 and the first and second machining unit interfaces 22,28 are equipped with aligning means 42, in this case with recesses 44 that interact with corresponding protrusions (not shown) of the respective work piece holder device 18 and the first and the second machining unit 24, 30. It is thus only possible to connect the work piece holder device 18 and the first and the second machining unit 30 with the work piece holder device interface 16 and the first and second machining unit interfaces 22, 28.

The machine base 10₁ in accordance with the first embodiment further comprises a work piece transfer unit receiving section 46 provided with a work piece transfer unit interface 48 running parallel to the x-z-plane (see also FIG. 1B). The work piece transfer unit receiving section 46 is adapted for receiving a work piece transfer unit 50 aligned along the x-axis (see FIGS. 9 and 10). It is evident from FIGS. 1A and 1B that the work piece transfer unit interface 48 is located on a projection of the first traverse girder 32 with reference to the first side wall 36 and the second side wall 38. When connected to the work piece transfer unit interface 48 the work piece transfer unit 50 abuts against the first side wall 36 and the second side wall 38 so that the work piece transfer unit 50 is aligned along the x-axis.

The machine base 10₁ of the first embodiment further comprises first lateral aligning interfaces 52₁ and second lateral aligning interfaces 52₂ running parallel to the y-z-plane for aligning the machine base 10₁ with one or more further machine bases 10₁ located laterally of the machine base 10₁. In the first embodiment the first lateral aligning interfaces 52₁ are formed by lateral extensions 54 formed by the first and the second side wall 36, 38 or connected to the first and second side wall 36, 38. The second lateral aligning interfaces 52₂ are formed by a foot 55 of the machine base 10₁.

Beyond that the machine base 10₁ in accordance with the first embodiment comprises at least one front aligning interface 56 running parallel to the x-y-plane for aligning the machine base 10₁ with a further machine base 10₁ located opposite of the machine base 10₁. The machine base 10₁ of the first embodiment comprises two front aligning interfaces 56 formed by the side walls 36, 38.

Furthermore the machine base 10₁ in accordance with the first embodiment comprises at least one swiveling device receiving section 58 provided with a swiveling device interface 60 that is located on the first side wall 36 of the machine base 10₁ and thus running parallel to the y-z-plane. The swiveling device receiving section 58 is adapted for receiving a swiveling device 62 (see FIGS. 10A and 10B).

In FIG. 2A a second embodiment of the machine base 10₂ is shown. The principle structure of the machine base 10₂ according to the second embodiment is the same as the structure of the machine base 10₁ according to the first embodiment. In contrast to the first embodiment the machine base 10₁ of the second embodiment comprises a first work piece holder device receiving section 14₁ provided with a first work piece holder device interface 16₁, a second work piece holder device receiving section 14₂ provided with a second work piece holder device interface 16₂, a primary first machining unit receiving section 20₁ provided with a primary first machining unit interface 22₁, a secondary first machining unit receiving section 20₂ provided with a secondary first machining unit interface 22₂, a primary second machining unit receiving section 26₁ provided with a primary second machining unit interface 28₁, and a secondary second machining unit receiving section 26₂ provided with a secondary second machining unit interface 28₂ (see FIG. 2B which is a bottom view of the second traverse girder 34).

The machine base 10₁ of the second embodiment comprises an upper middle wall 64 arranged between the first traverse girder 32 and the second traverse girder 34. Moreover the machine base 10₂ according to the second embodiment comprises a lower middle wall 66 running between the second traverse girder 34 and the base traverse girder 40. The lower middle wall 66 forms a further front aligning interface 56.

FIG. 3 shows a perspective view of a first embodiment of a machining system 68₁. The machining system 68₁ comprises the machine base 10₂ according to the second embodiment. Beyond that the machining system 68₁ is equipped with a first work piece holder device 18₁ connected to the first work piece holder device interface 16₁ (not visible, cf. FIG. 2A) and aligned along the z-axis, and a second work piece holder device 18₂ connected to the second work piece holder device interface 16₂ and aligned along the z-axis (see FIG. 2A).

The machining system 68₁ further comprises a primary first machining unit 24₁ connected to the primary first machining unit interface 22₁, the primary first machining unit 24, and a secondary first machining unit 24₂ connected to the secondary first machining unit interface 22₂, the secondary first machining unit 24₂. Moreover the machining system 68₁ comprises a primary second machining unit 30₁ connected to the primary second machining unit interface 28₁, and a secondary second machining unit 30₂ connected to the secondary second machining unit interface 28₂.

Moreover the machining system 68₁ according to the first embodiment comprises a work piece transfer unit 50 connected to the work piece transfer unit interface 48 (see FIG. 1B), the work piece transfer unit 50 being aligned along the x-axis. A work piece can be transported along the x-axis and being clamped for machining into the first work piece holder device 18₁ and the second work piece holder device 18₂. Consequently the work piece can be machined by in total four machining units 24, 30.

In FIG. 4 a work piece holder device 18 is separately shown. In its basic design the work piece holder device 18 comprises a work piece holding section 70 that may be equipped with a jaw chuck, a collet clamping or the like. The work piece can be inserted into the work piece holding section 70 from a front end or from a rear end by a translational movement along the z-axis. The work piece holding device section 70 is movably mounted along the z-axis on a support structure 72. In the basic design the work piece holding section 70 is not rotatable around the z-axis, however, if desired the work piece holder device 18 may be adjusted to allow the rotation of the work piece holding section 70 around the z-axis in addition to the translational movement along the z-axis.

The first machining unit 24 comprises a first tool holder interface 77 in this embodiment formed by a cube shaped body 74 running parallel to the x-y-axis and movable at least along the x or y-axis (see also FIG. 7A). Accordingly, the second machining unit 30 comprises a second tool holder interface 79 also running parallel to the x-y-axis and movable at least along the x- or y-axis. Any kind of tool holding devices 84 (not shown in FIG. 3 but see FIG. 5A) can be connected to the first and the second tool holder interface 77, 79. The movement of the first and second tool holder interfaces 77, 79 is transferred to the tool holding devices 84 connected hereto. In case the tool holding devices 84 should provide a rotary movement they are equipped with individual motors (not shown).

With reference to FIG. 3 the tool holder interfaces 77, 79 are at least movable along the y-axis so that a tool connected to the tool holding device 84 (FIG. 5A) may be moved relative to the work piece holder device 18. As explained above, the work piece holder device 18 is at least movable along the z-axis so that a relative movement between a tool and the work piece necessary for the machining of the work piece is possible.

In order to protect the machining units 24, 30 from chips and other debris produced upon machining of a work piece the machining system $68_1$ comprises a number of protective walls 76 mounted on the machine base $10_1$ and arranged in front of the respective machining units 24, 30. The protective walls 76 comprise openings which may be traversed by the cube shaped body 74 of the machining units 24, 30. Depending on the design of the machining units 24, 30 the respective tool holder interfaces 77, 79 may be movable along the x-axis, the y-axis and the z-axis of the coordinate system 12. To allow the movement along the x-axis and the y-axis the openings of the protective walls 76 must be sufficiently big, the openings are covered by a shutting unit 78 such as telescopic protections, sheet pockets or similar 80. To provide an adequate protection of the machining units 24, 30 from chips and the like the openings are closed by a sheet pocket 80 movable by the cube shaped body 74 along the x-axis and the y-axis. As the sheet pockets 80 entirely close the openings they cannot be traversed by chips and the like.

In FIGS. 5A and 5B a second embodiment of the machining system $68_2$ is shown by two different perspectives. In this case a work spindle 82 is connected to the first tool holder interface 77 of the secondary first machining unit $24_2$. Accordingly, another work spindle 82 is connected to the second tool holder interface 79 of the secondary second machining unit $30_2$ (see FIG. 5B). The work spindles 82 are equipped with a motor (not shown) which generates the rotary movement around the y-axis. To the second tool holder interface 79 of the primary second machining unit $30_1$ a tool holding device 84 is connected into which a plurality of tools can be inserted aligned along the x-axis, the y-axis or the z-axis. The tool holding device 84 is movable at least along the x-axis or the y-axis. The tools inserted into the tool holding device 84 may not necessarily be rotatable around their own axis.

As particularly evident from FIG. 5B the primary first machining unit $24_1$ is rotated by 180° around the z-axis with respect to the primary second machining unit $30_1$. The secondary first machining unit $24_2$ is also rotated by 180° around the z-axis with respect to the secondary second machining unit $30_2$.

FIG. 6A is a perspective front view and FIG. 6B is a perspective back view of a third embodiment of a machine base $10_3$ which is to a large extent identical to the machine base $10_2$ of the second embodiment. Therefore, only the differences are discussed in the following. Between the first side wall 36 and the lower middle wall 66 the machine base $10_3$ comprises a first intermediate wall 65 and between the second side wall 38 and the lower middle wall 66 a second intermediate wall 67. The first and second intermediate walls 65, 67 run perpendicular to the first and second traverse girders 32, 34 and thus parallel to the vertical x-y-plane. In the third embodiment of the machine base $10_3$ the primary second machining unit receiving section $26_1$ and the primary second machining unit interface $28_1$ are located on the first intermediate wall. The secondary second machining unit receiving section $26_2$ and the secondary second machining unit interface $28_2$ are located on the second intermediate wall.

In FIGS. 7A and 7B a machining system $68_3$ according to a third embodiment is shown by means of a perspective front view and a perspective back view, respectively. The machining system $68_3$ comprises a machine base $10_3$ according to the third embodiment shown in FIGS. 6A and 6B. The principle setup of the machining system $68_3$ of the third embodiment is to a large extent the same as explained for the machining system $68_1$ of the first embodiment and the machining system $68_2$ of the second embodiment. However, due to the different orientation of the primary second machining unit receiving section $26_1$ and the primary second machining unit interface $28_1$ as well as the secondary second machining unit receiving section $26_2$ and the secondary second machining unit interface $28_2$ the primary first machining unit $24_1$ is not mirrored to the primary second machining unit $30_1$ and the secondary first machining unit $24_2$ is not mirrored to the secondary second machining unit $30_2$. Instead they are arranged relative to each other rotated by 90° around the x-axis.

In FIG. 8A a machining system $68_4$ according to a fourth embodiment is shown by means of a perspective view. The machining system $68_4$ comprises two machine bases $10_2$ according to the second embodiment shown in FIG. 2A that are oppositely arranged to each other and aligned to each other by the front aligning interfaces 56. The two machine bases $10_2$ could also be integrated into one single machine base (not shown). The design of the two machine bases $10_2$ substantially the same so that the machining system $68_4$ of the fourth embodiment comprises four work piece devices 18 connected to a corresponding number of work piece holder device interfaces 16 and eight machining units 24, 30 connected to a corresponding number of machining unit interfaces 22, 28. Beyond that the machining system $68_4$ may comprise a first work piece transfer unit $50_1$ connected to a first work piece transfer unit interface 48 of the first machine base $10_1$ and a second work piece transfer unit $50_2$ connected to a second work piece transfer unit interface 48 of the second machine base $10_1$ (see FIG. 7).

For the sake of clarity only one of the machine bases $10_2$ is shown in FIG. 8B. A tool holding device 84 embodied as a revolver 88 is connected to the first tool holder interface 77 of the primary first machining unit $24_1$. A number of tools may be mounted on the revolver 88. The tools may be rotatable around their own axes. A tool holding device 84 is connected to the second tool holder interface 79 of the primary second machining unit $30_1$. A tool changer 86 is connected to the first tool holder interface 77 of the machining unit opposite of the secondary first machining unit $24_2$ (not shown).

In FIG. 9 a fifth embodiment of the machining system $68_5$ according to the invention is shown by means of a top view. The principle layout of the machining system $68_5$ according to the fifth embodiment is to a large extent the same as the layout of the machining system $68_4$ according to the fourth embodiment. However, the machining system $68_5$ of the fifth embodiment comprises a first machine base 10a, a second machine base 10b, a third machine base 10c and a fourth machine base 10d, all according to the first embodiment shown in FIG. 1A. The first machine base 10a and the second machine base 10b are connected to each other via the lateral aligning interface 52. Likewise, the third machine base 10c and the fourth machine base 10d are connected to each other via the lateral aligning interface 52. The first machine base $10_1$ and the third machine base $10_1$ are connected to each other via the front aligning interface 56 and the second machine base 10b and the fourth machine base 10d are connected to each other via the front aligning interface 56.

The machining system $68_5$ of the fifth embodiment comprises a swiveling device 62 connected to the swiveling device 62 interface of the second machine base 10b. The swiveling device 62 is separately shown in FIGS. 10A and 10B. The swiveling device 62 is rotatable around the x-axis and comprises a gripping device 90 for gripping a work piece 91 or for gripping a palette 93 (see FIG. 12).

The machining system $68_4$ according to the fourth and the machining system $68s$ according to the fifth embodiment may be subdivided into four machining stations $92_1$ to $92_4$, each of which comprise a work piece holder device 18, a first machining unit 24 and a second machining unit 30. The machining system $68s$ may be operated in many different modes, some of which are explained in the following.

In a first mode which is schematically shown in FIG. 11A the four machining stations $92_1$ to $92_4$ may be operated independent from each other. A raw first work piece to be machined may be delivered to the first machining station $92_1$ by means of the first work piece transfer unit $50_1$. While the first work piece is machined in the first machining station $92_1$ the first work piece transfer unit $50_1$ may deliver a second work piece to the second machining station $92_2$. After the first work piece is finished the first work piece transfer unit $50_1$ unloads the first work piece from the first machining station $92_1$ and loads the first machining station $92_1$ with a new raw work piece. Subsequently the first work piece transfer unit $50_1$ unloads the second work piece from the second machining station $92_2$. The same steps may be conducted inside the third machining station $92_3$ and the fourth machining station $92_4$. The first work piece transfer unit $50_1$ and the second work piece transfer unit $50_2$ may be designed in a way that they may simultaneously load and unload the work pieces.

In a second mode which is schematically shown in FIG. 11B a first work piece is machined in the first and the second machining station $92_1$, $92_2$ and a second work piece is simultaneously machined in the third and the fourth machining station $92_3$, $92_4$. The first work piece transfer unit $50_1$ delivers the raw first work piece to the first machining station $92_1$. After the machining in the first machining station $92_1$ is finished the first work piece transfer unit $50_1$ transports the first work piece to the second machining station $92_2$. When the machining of the first work piece in the second machining station $92_2$ is finished the first work piece transfer unit $50_1$ unloads the finished first work piece from the machining system $68_5$. The same steps may be conducted inside the third machining station $92_3$ and the fourth machining station $92_4$.

In a third mode which is schematically shown in FIG. 11C the first work piece transfer unit $50_1$ delivers the raw first work piece to the first machining station $92_1$. After the machining is finished the work piece is transferred to the opposite third machining station $92_3$. This transfer is conducted by the two work piece holder devices 18 that are located in proximity to each other along the z-axis. When the machining of the first work piece in the third machining station $92_3$ is finished the first work piece is transferred to the fourth machining station $92_4$ by means of the second work piece transfer unit $50_2$. Once the machining in the fourth machining station $92_4$ is finished the work piece is transferred to the second machining station $92_2$ again by locating the two work piece holder devices 18 in proximity to each other along the z-axis. The first work piece transfer unit $50_1$ unloads the finished work piece from the machining system $68_5$ once the machining of the work piece in the second machining station $92_2$ is finished.

In a fourth mode which is schematically shown in FIG. 11D the machining of the work piece is to a large extent the same as in the third mode, however, the transfer of the work piece between the fourth machining station $92_4$ and the second machining station $92_2$ is conducted by means of the swiveling device 62. The difference in the two transfers is that the work piece is rotated around the x-axis by the swiveling device 62 so that the same end of the work piece is inserted into the work piece holding section 70 of the work piece holder device 18.

The machining system $68_4$, $68s$ of the fourth and fifth embodiment may be operated by many more modes that are combinations and/or modifications of the modes presented above.

As already mentioned the swiveling device 62 is separately shown in FIGS. 10A and 10B. In FIG. 10A the gripping device 90 of the swiveling device 62 is adapted for receiving the work piece 91 whereas in FIG. 10B the gripping device 90 is adapted for receiving the palette 93 that is shown in greater detail in FIG. 12. The palette 93 comprises a precise palette interface 95 that can be clamped into the jaw chucks of the work piece holding sections 70 of the work piece holder device 18. The palette 93 itself comprises a clamping section 99 that may comprise a chuck, a collet device or similar 97 into which a work piece 91 may be clamped (see FIG. 10B).

FIG. 13 shows the machining system $68_1$ along the lines with the first embodiment, however, the work piece transfer unit 50 in this case transfers the palette 93 between the different work piece holder devices 70. The work piece 91 remains clamped in the palette 93 throughout the entire machining. Due to the fact that a work piece may remain clamped inside the palette 93 throughout the entire machining the machining precision is considerably higher compared to a work piece 91 that is released and re-clamped each time it is machined by another machining unit.

Figure 14A:
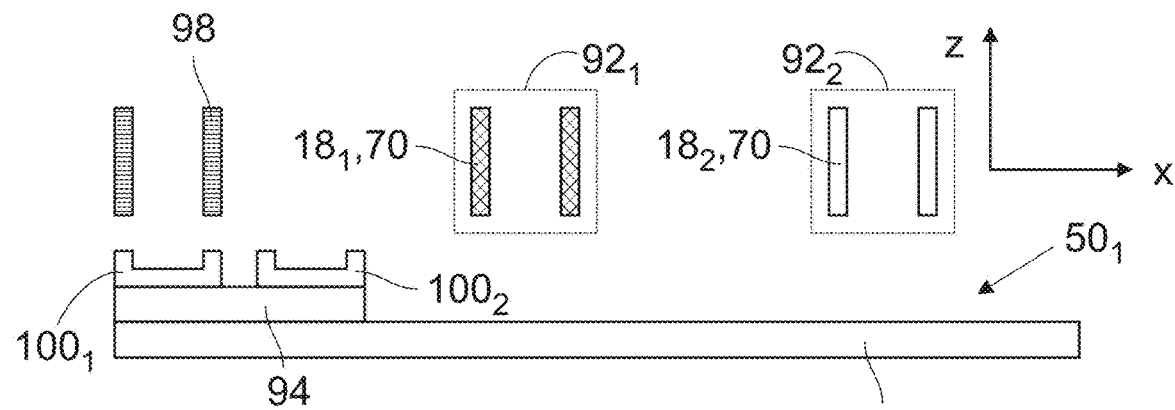
Figure 14B:
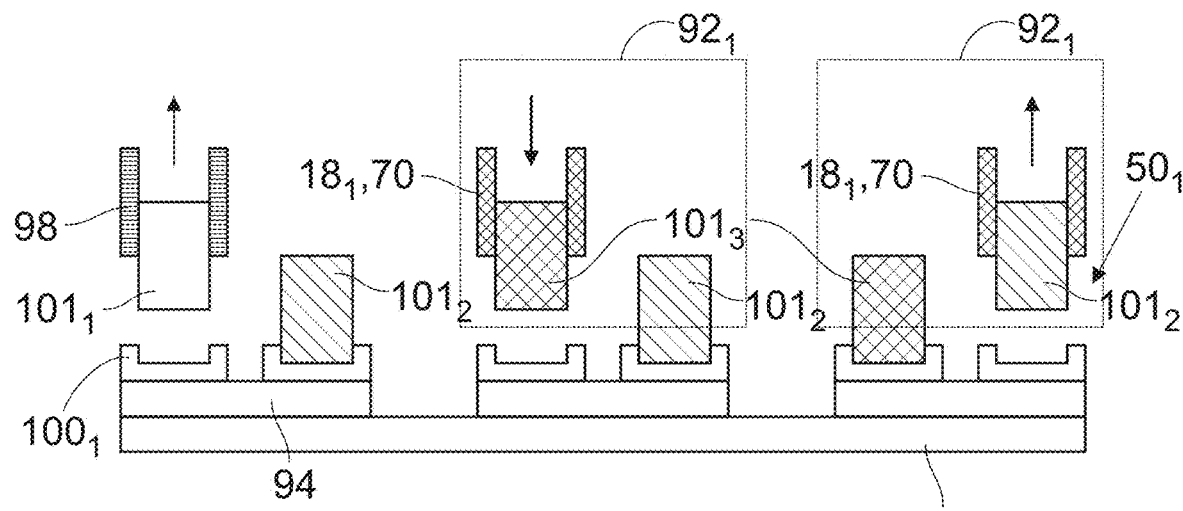

In FIGS. 14A and 14B a first embodiment of the work piece transfer unit $50_1$ is shown by means of a principle sketch which may be incorporated into a machining system 68 according to one of the presented embodiments, for example into the machining system $68_4$ according to the fourth embodiment. The work piece transfer unit $50_1$ comprises a slide 94 that is movably mounted on a sliding track 96 that is aligned along the x-axis. In the first embodiment the slide 94 comprises a first clamping section $100_1$ and a second clamping section $100_2$ and one loading and unloading device 98 located on one side of the machining system $68_4$.

In a first position (see FIG. 14B) a finished work piece $101_1$ located in the first clamping section $100_1$ is unloaded by the loading and unloading device 98 and a raw work piece $101_2$ is loaded into the second clamping section $100_1$, also by the loading and unloading device 98. Depending on the design of the loading and unloading device 98 the slide 94 is moved between the unloading and the loading processes. The first clamping section $100_1$ remains empty. After that the slide 94 is moved along the sliding track 96 so that the empty first clamping section $100_1$ is placed in front of the work piece holding section 70 of the first work piece holder device $18_1$. A work piece $101_3$ machined by the first machining station $92_1$ is inserted into the first clamping section $100_1$. In the next step the slide 94 is moved into a positon in which the raw work piece $101_2$ can be inserted into the work piece holding section 70 of the first work piece holder device 18 and be machined. The second clamping section $100_2$ is now empty.

Depending on the mode the machining system $68_1$ is operated the work piece machined in the first machining station $92_1$ is not machined any further and the slide 94 moved into a position in which the machined work piece $101_3$ can be unloaded from the first clamping section $100_1$ and a new raw work piece $101_2$ inserted into the second clamping section $100_2$.

In case the work piece $101_3$ is further machined in the second machining station $92_1$ the slide 94 is moved into a position in which a work piece $101_1$ machined in the second machining station $92_1$ (not shown) can be inserted into the empty second clamping section $100_2$. Subsequently the slide 94 is moved into a position in which the work piece $101_3$ machined in the first machining station $92_1$ can be inserted into the work piece holding section 70 of the second work piece holder device $18_2$. In the meantime the work piece $101_1$ machined in the second machining station $92_1$ is unloaded from the second clamping section $100_2$ and a raw work piece $101_2$ is inserted into the first clamping section $100_1$.

Figures 15A, 15B:
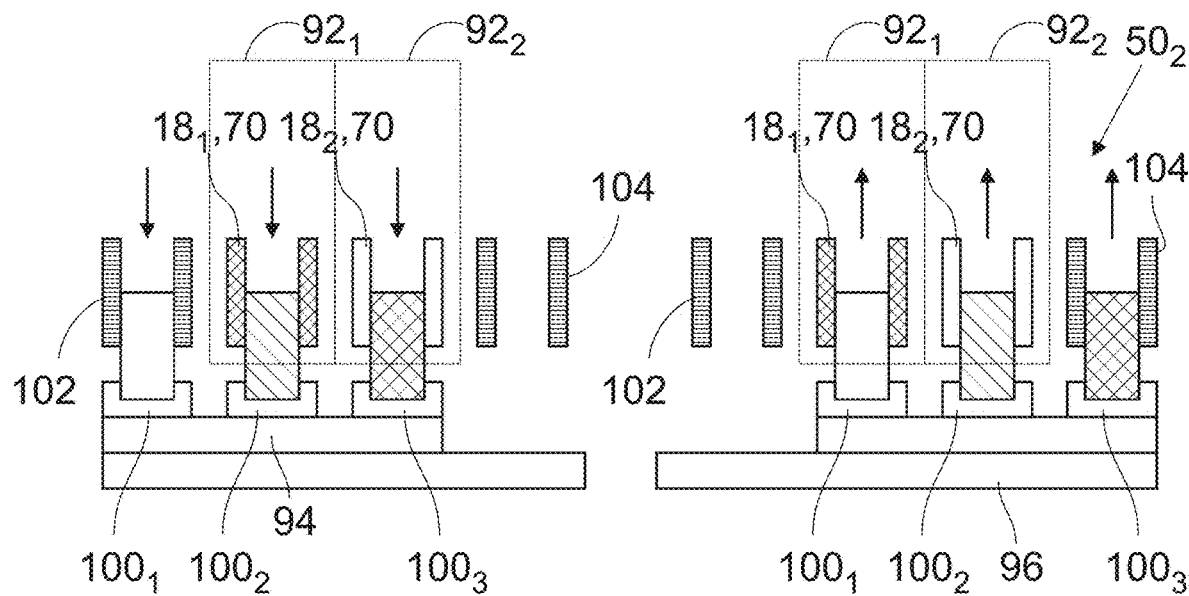

In FIGS. 15A and 15B a second embodiment of the work piece transfer unit $50_2$ is shown which mainly differs from the first embodiment in that the slide 94 comprises three clamping sections $100_1$, $100_2$, $100_3$. Moreover the work piece transfer unit 50 of the second embodiment comprises a loading device $10_2$ on one side of the machining system $68_1$ and an unloading device 104 on the opposite side of the machining system $68_1$. The three clamping sections $100_1$, $100_2$, $100_3$ are arranged on the slide 94 so that in the appropriate position they can be accessed by the work piece holding sections 70 of the first and the second work piece holder devices $18_1$, $18_2$ and of the loading device 102 or the unloading device 104.

In this case the slide 94 can be moved between two positions. In the first position (FIG. 15A) a raw work piece is inserted into the first clamping section $100_1$ by the loading device 102. A work piece readily machined in the first machining station $92_1$ is inserted into the second clamping section $100_2$ and the finished work piece machined in the second machine station $92_2$ is inserted into the second clamping section $100_2$. After that the slide 94 is moved into a second position (see FIG. 15B) in which the raw work piece is withdrawn from the first clamping section $100_1$ for machining in the first machining station $92_1$, the work piece machined in the first machining station $92_1$ is withdrawn from the second clamping section $100_2$ for machining in the second machining station $92_2$ and the finished work piece is withdrawn from the third clamping section $100_3$ by the unloading device 104 on the right hand side of the machining system $68_4$. The empty slide 94 is then moved back to the first position and the steps described repeated.

REFERENCE LIST 10 machine base
$10_1$ machine base according to a first embodiment
$10_2$ machine base according to a second embodiment
$10_3$ machine base according to a third embodiment
10a first machine base
10b second machine base
10c third machine base
10d fourth machine base
12 coordinate system
14 work piece holder device receiving section
16 work piece holder device interface
18 work piece holder device
20 first machining unit receiving section
$20_1$ primary first machining unit receiving section
$20_2$ secondary first machining unit receiving section
22 first machining unit interface
$22_1$ primary first machining unit interface
$22_2$ secondary first machining unit interface
24 first machining unit
$24_1$ primary first machining unit
$24_2$ secondary first machining unit
26 second machining unit receiving section
$26_1$ primary second machining unit receiving section
$26_2$ secondary second machining unit receiving section
28 second machining unit interface
$28_1$ primary second machining unit interface
$28_2$ secondary second machining unit interface
30 second machining unit
$30_1$ primary second machining unit
$30_2$ secondary second machining unit
32 first traverse girder
34 second traverse girder
36 first side wall
38 second side wall
40 base traverse girder
42 aligning means
44 recess
46 work piece transfer unit receiving section
48 work piece transfer unit interface
50 work piece transfer unit
$50_1$ first work piece transfer unit
$50_2$ second work piece transfer unit
52 lateral aligning interface
54 lateral extension
56 front aligning interface
58 swiveling device receiving section
60 swiveling device interface
62 swiveling device
64 upper middle wall
65 first intermediate wall
66 lower middle wall
67 second intermediate wall
68 machining system
$68_1$ to $68_5$ embodiments of the machining system
70 work piece holding section
72 support structure
74 cube shaped body
76 protective wall
77 first tool holder interface
78 shutting unit
79 second tool holder interface
80 sheet pocket
82 work spindle
84 tool holding device
86 tool changer
88 revolver
90 gripping device
91 work piece
92 machine station
$92_1$ to $92_4$ first to fourth machine station
93 palette
94 slide
95 palette interface
96 sliding track
97 chuck
98 loading and unloading device
99 clamping section of palette
100 clamping section
$100_1$ first clamping section
$100_2$ second clamping section
$100_3$ third clamping section
102 loading device
104 unloading device
The invention claimed is:

1. A machine base (10) for use in a machining system, the machine base (10) defining an x,y,z-coordinate system (12) and comprising:
- at least one work piece holder device receiving section (14) provided with a work piece holder device interface (16) comprising aligning means (42);
- a work piece holder device (18) aligned along a z-axis of the x,y,z-coordinate system (12), the aligning means (42) being adapted for receiving the work piece holder device (18), wherein the work piece holder device (18) comprises a work piece holding section (70) for clamping and aligning a work piece along the z-axis, and wherein the work piece holding section (70) is movably mounted along the z-axis on a support structure (72);
- at least one first machining unit receiving section (20) provided with a first machining unit interface (22) adapted for receiving a first machining unit (24) comprising a first tool holder interface (77); and
- at least one second machining unit receiving section (26) provided with a second machining unit interface (28) adapted for receiving a second machining unit (30) comprising a second tool holder interface (79),
- the first machining unit interface (22) being arranged at a first side of, and at a distance from, the work piece holder device interface (16) and such that the first tool holder interface (77) is movable at least along the x- or y-axis,
- the second machining unit interface (28) being arranged at a second side of, and at a distance from, the work piece holder device interface (16) and such that the second tool holder interface (79) is movable at least along the x- or y-axis, the first side opposing the second side, and
- at least one work piece transfer unit receiving section (46) provided with a transfer unit interface (48) adapted for receiving a work piece transfer unit (50),
- the work piece holder device interface (16) defining an x-z-plane, the x-z-plane running horizontally,
- the first machining unit interface (22) running parallel to the x-z-plane and adapted for receiving the first machining unit (24), and
- the second machining unit interface (26) running parallel to the x-z-plane and adapted for receiving the second machining unit (30),
- wherein the first machining unit interface (22) is arranged above the holder device interface (16) and facing upwards, and
- wherein the second machining unit interface (28) is arranged below the holder device interface (16) and facing downwards.

2. The machine base (10) according to claim 1, wherein the transfer unit interface (48) is running parallel to the x-z-plane and adapted for receiving the work piece transfer unit (50) aligned along the x-axis.

3. The machine base (10) according to claim 1, wherein the machine base (10) comprises at least one lateral aligning interface (52) running parallel to the y-z-plane for aligning the machine base (10) with a further machine base (10).

4. The machine base (10) according to claim 1, wherein the machine base (10) comprises at least one front aligning interface (56) running parallel to the x-y-plane for aligning the machine base (10) with a further machine base (10).

5. The machine base (10) according to claim 1, wherein the machine base (10) comprises at least one swiveling device receiving section (58) provided with a swiveling device interface (60) adapted for receiving a swiveling device (62).

6. The machine base (10) according to claim 1, wherein the machine base (10) further comprises:
- a first work piece holder device receiving section (14$_1$) provided with a first holder device interface (16$_1$),
- a second work piece holder device receiving section (14$_2$) provided with a second holder device interface (16$_2$),
- a primary first machining unit receiving section (20$_1$) provided with a primary first machining unit interface (22$_1$),
- a secondary first machining unit receiving section (20$_2$) provided with a secondary first machining unit interface (22$_2$),
- a primary second machining unit receiving section (26$_1$) provided with a primary second machining unit interface (28$_1$), and
- a secondary second machining unit receiving section (26$_2$) provided with a secondary second machining unit interface (28$_2$).

7. A machining system for machining a work piece, comprising:
- at least one machine base (10) according to claim 1,
- a work piece holder device (18) connected to the holder device interface (16) and aligned along the z-axis, the work piece holder device (18) being adapted for clamping and aligning a work piece along the z-axis and for moving the work piece along the z-axis,
- a first machining unit (24) connected to the first machining unit interface (22) and comprising a first tool holder interface (77) movable at least along the x- or y-axis, and
- a work piece transfer unit (50) connected to the transfer unit interface (48).

8. The machining system according to claim 7, comprising:
- the first machining unit (24) connected to the first machining unit interface (22),
- the work piece transfer unit (50) connected to the transfer unit interface (48), the work piece transfer unit (50) being aligned along the x-axis, and
- a second machining unit (30) connected to the second machining unit interface (28) and comprising a second tool holder interface (79) movable at least along the x-axis or the y-axis.

9. The machining system according to claim 7, further comprising:
- a first machine base (10$_1$),
- a second machine base (10$_2$),
- wherein the first machine base (10$_1$) and the second machine base (10$_2$) are connected to each other via the lateral aligning interface (52).

10. The machining system according to claim 7, comprising:
- a third machine base (10$_3$), and
- a fourth machine base (10$_4$),
- the third machine base (10$_3$) and the fourth machine base (10$_4$) connected to each other via the lateral aligning interface (52),
- the first machine base (10$_1$) and the third machine base (10$_3$) connected to each other via the front aligning interface (56), and the second machine base (10₂) and the fourth machine base (10₄) connected to each other via the front aligning interface (56).

11. A machining system for machining a work piece, comprising:
the machine base (10) according to claim 6,
a first work piece holder device (18₁) connected to the first holder device interface (16₁) and aligned along the z-axis,
a second work piece holder device (18₂) connected to the second holder device interface (16₂) and aligned along the z-axis,
a primary first machining unit (24₁) connected to the primary first machining unit interface (22₁),
a secondary first machining unit (24₂) connected to the secondary first machining unit interface (22₂),
a primary second machining unit (30₁) connected to the primary second machining unit interface (28₁),
a secondary second machining unit (30₂) connected to the secondary second machining unit interface (28₂), and
a work piece transfer unit (50) connected to the transfer unit interface (48), the work piece transfer unit (50) being aligned along the x-axis.

12. The machining system according to claim 11, comprising:
a first machine base (10₁),
a second machine base (10₂),
wherein the first machine base (10₁) and the second machine base (10₂) are connected to each other via the front aligning interface (56).

13. The machining system according to claim 10, further comprising:
at least one swiveling device (62) connected to the swiveling device interface (60).

14. The machining system according to claim 7,
wherein the work piece holder device (18), the work piece transfer unit (50) or the swiveling device (62) are adapted for receiving a palette (91).

15. A machine base (10) for use in a machining system, the machine base (10) defining an x,y,z-coordinate system (12) and comprising:
at least one work piece holder device receiving section (14) provided with a work piece holder device interface (16) comprising aligning means (42);
a work piece holder device (18) aligned along a z-axis of the x,y,z-coordinate system (12), the aligning means (42) being adapted for receiving the work piece holder device (18), wherein the work piece holder device (18) comprises a work piece holding section (70) for clamping and aligning a work piece along the z-axis, and wherein the work piece holding section (70) is movably mounted along the z-axis on a support structure (72);
at least one first machining unit receiving section (20) provided with a first machining unit interface (22) adapted for receiving a first machining unit (24) comprising a first tool holder interface (77); and
at least one second machining unit receiving section (26) provided with a second machining unit interface (28) adapted for receiving a second machining unit (30) comprising a second tool holder interface (79),
the first machining unit interface (22) being arranged at a first side of, and at a distance from, the work piece holder device interface (16) and such that the first tool holder interface (77) is movable at least along the x- or y-axis,
the second machining unit interface (28) being arranged at a second side of, and at a distance from, the work piece holder device interface (16) and such that the second tool holder interface (79) is movable at least along the x- or y-axis, the first side opposing the second side, and
at least one work piece transfer unit receiving section (46) provided with a transfer unit interface (48) adapted for receiving a work piece transfer unit (50),
the work piece holder device interface (16) defining an x-z-plane, the x-z-plane running horizontally,
the first machining unit interface (22) running parallel to the x-z-plane and adapted for receiving the first machining unit (24), and
the second machining unit interface (26) running parallel to the x-z-plane and adapted for receiving the second machining unit (30), and
wherein the second machining unit interface (28) is arranged below the holder device interface (16) and facing downwards.

16. A machine base (10) for use in a machining system, the machine base (10) defining an x,y,z-coordinate system (12) and comprising:
at least one work piece holder device receiving section (14) provided with a work piece holder device interface (16) comprising aligning means (42);
a work piece holder device (18) aligned along a z-axis of the x,y,z-coordinate system (12), the aligning means (42) being adapted for receiving the work piece holder device (18), wherein the work piece holder device (18) comprises a work piece holding section (70) for clamping and aligning a work piece along the z-axis, and wherein the work piece holding section (70) is movably mounted along the z-axis on a support structure (72);
at least one first machining unit receiving section (20) provided with a first machining unit interface (22) adapted for receiving a first machining unit (24) comprising a first tool holder interface (77); and
at least one second machining unit receiving section (26) provided with a second machining unit interface (28) adapted for receiving a second machining unit (30) comprising a second tool holder interface (79),
the first machining unit interface (22) being arranged at a first side of, and at a distance from, the work piece holder device interface (16) and such that the first tool holder interface (77) is movable at least along the x- or y-axis,
the second machining unit interface (28) being arranged at a second side of, and at a distance from, the work piece holder device interface (16) and such that the second tool holder interface (79) is movable at least along the x- or y-axis, the first side opposing the second side, and
at least one work piece transfer unit receiving section (46) provided with a transfer unit interface (48) adapted for receiving a work piece transfer unit (50),
the work piece holder device interface (16) defining an x-z-plane, the x-z-plane running horizontally,
the first machining unit interface (22) running parallel to the x-z-plane and adapted for receiving the first machining unit (24), and
the second machining unit interface (26) running parallel to the x-z-plane and adapted for receiving the second machining unit (30), and
wherein the first machining unit interface (22) is arranged above the holder device interface (16) and facing upwards.

17. A machining system for machining a work piece, comprising:
- at least one machine base (10) according to claim 1;
- a work piece holder device (18) connected to the holder device interface (16) and aligned along the z-axis, the work piece holder device (18) being adapted for clamping and aligning a work piece along the z-axis and for moving the work piece along the z-axis; and
- a work piece transfer unit (50) connected to the transfer unit interface (48).

* * * * *